United States Patent [19]

Moody et al.

[11] 4,139,984

[45] Feb. 20, 1979

[54] DEVICE FOR DERIVING POWER FROM WAVE ENERGY

[75] Inventors: George W. Moody, East Kilbride, Scotland; John L. Wilson, Sunbury-on-Thames, England

[73] Assignee: The Secretary of State for Energy in Her Britannic Majesty's Government of the United Kingdom of Great Britain and Northern Ireland, London, England

[21] Appl. No.: 824,832

[22] Filed: Aug. 15, 1977

[30] Foreign Application Priority Data

Aug. 18, 1976 [GB] United Kingdom ............... 34378/76

[51] Int. Cl.² ............................................. E02B 9/00
[52] U.S. Cl. ...................................... 60/398; 290/53; 417/100; 405/76
[58] Field of Search ................. 60/398, 407, 413, 497, 60/499, 502; 61/19, 20; 417/330, 331, 337, 100; 290/42, 53

[56] References Cited

U.S. PATENT DOCUMENTS

| | | | |
|---|---|---|---|
| 1,791,239 | 2/1931 | Braselton | 417/100 |
| 2,170,890 | 8/1939 | Allen | 60/415 X |
| 3,200,255 | 8/1965 | Masuda | 290/53 |

Primary Examiner—Edgar W. Geoghegan
Attorney, Agent, or Firm—Larson, Taylor & Hinds

[57] ABSTRACT

A device for extracting energy from wave energy and comprising a plurality of chambers adapted for pressurizing and discharging a working gas, means for collecting the pressurized working gas, and a mechanical device such as an air turbine to which the collected pressurized working gas is conducted to extract energy therefrom and drive a device such as an electric generator.

The pressurized working gas may be collected in a duct which connects the chambers in parallel relationship and is provided with means for applying a smoothing pressure to smooth out pressure fluctuations of the pressurized working gas. Alternatively, the chambers may be connected together in series relationship so that the pressurized working gas from one chamber is collected by an adjacent chamber as it progresses along the series to the mechanical device.

15 Claims, 6 Drawing Figures

DEVICE FOR DERIVING POWER FROM WAVE ENERGY

BACKGROUND TO THE INVENTION

This invention relates to devices for extracting power from wave energy and more particularly, but not exclusively, wave energy from sea waves.

In one known device for utilising wave energy invented by Yoshio Masuda and described in British patent specification No. 1,014,196, a working gas in a chamber is caused to flow through a turbine positioned above the chamber by the oscillation of a column of water in the chamber, the chamber being defined by a buoy device. Such devices have so far been used for applications requiring relatively low power outputs and the present invention is more particularly concerned with applications for deriving relatively larger amounts of power from wave energy.

SUMMARY OF THE INVENTION

According to the present invention, a device for extracting energy from waves on a liquid upon which the device is adapted to float, comprises a plurality of chambers each adapted for pressurising and discharging a working gas by the action of a column of liquid which is arranged to be oscillated by the motion of the waves, means for collecting the pressurised working gas from the said plurality of chambers, and mechanical means to which the collected pressurised working gas is conducted to extract energy from said pressurised working gas and thereby from said waves.

The chambers may be connected together in series relationship so that the chambers also comprise the means for collectively conducting the pressurised working gas to the mechanical means and such that pressurised working gas is arranged to be discharged into an adjacent chamber along the series. Alternatively, the conducting means may comprise a common duct for connecting the chambers in parallel relationship and into which each chamber is adapted to discharge the pressurised working gas, and preferably the duct is provided with means for applying a smoothing pressure on the working gas therein to smooth out pressure fluctuations of said working gas.

Some of the chambers may be arranged in series relationship and some in parallel relationship, the series and parallel arrangements being adapted for connection together.

The device may be adapted to operate as a generator using air as the working gas, and seawater as the liquid from which wave energy is to be extracted, and the mechanical means may comprise a turbine means adapted to drive an electric generator means. Alternatively, the device may be adapted to function as a breakwater, the mechanical means comprising an orifice.

BRIEF EXPLANATION OF THE DRAWINGS

The invention will now be particularly described by way of example only and with reference to the accompanying drawings in which.

In the above-mentioned Figures, like parts have like numerals.

DETAILED DESCRIPTION OF THE INVENTION

Figure 1:
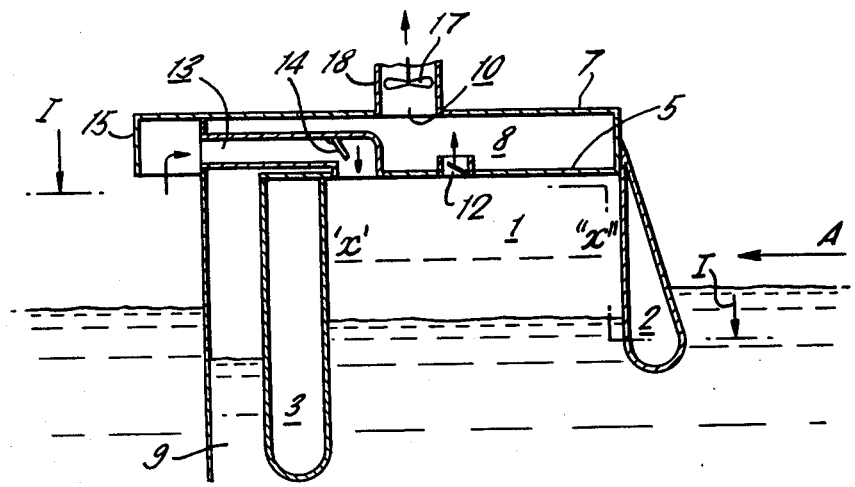
FIG. 1 shows in sectional elevation a diagrammatic representation of a device in the form of a generator structure having a parallel arrangement of chambers aligned perpendicular to the direction of the incoming waves.
Figure 1A:
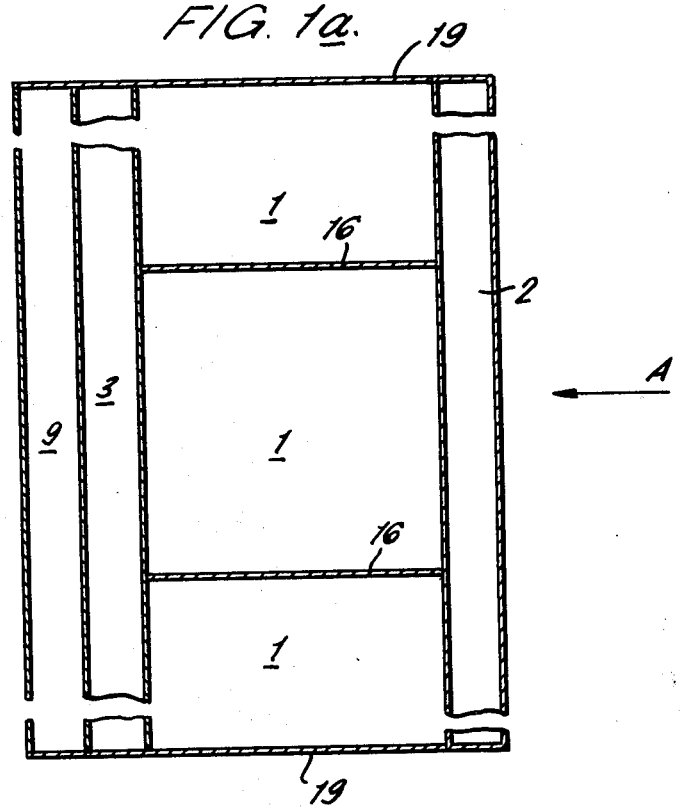
FIG. 1a shows a diagrammatic sectional representation on the line I—I in FIG. 1.

Referring now to FIGS. 1 and 1a, the floating generator structure shown is intended for deriving power from sea waves, and comprises a plurality of chambers 1 for a working gas (e.g. air) defined fore and aft with respect to the direction of the incoming waves as shown by the arrow 'A' in FIG. 1 by a generally triangular-shaped buoyancy tank 2 and a generally rectangular-shaped buoyancy tank 3, both of which have a rounded lower edge and extend for the entire length of the generator structure to support the structure on the surface of the sea.

The top of the chamber 1 is defined by a roof 5, and an outer casing 7 spaced from the roof 5 and the aft buoyancy tank 3 defines therebetween a common plenum duct 8 which extends for the entire length of the generator structure. The lower end 9 of the duct 8 extends below the sea level and is left open so as to provide an inlet for seawater which closes the lower end 9.

An outlet non-return valve 12 in the roof 5 allows air to be discharged therethrough from the chamber 1 into the plenum duct 8. An inlet duct 13 of tubular form extends from the aft portion of the casing 7 to the roof 5 to provide an inlet for air from outside the casing 7 into the chamber 1, a non-return valve 14 in the inlet duct 13 inhibiting the reverse flow of air from the chamber 1, and a hood 15 protecting the end of the inlet duct 13 at the casing 7 from sea spray.

The sides of the chambers 1 are defined by side walls 16 and end walls 19 as shown in FIG. 1a. A mechanical means in the form of an air turbine 17 is coupled to an electric generator (not shown) and is positioned in a duct 18 extending upwardly from an orifice 10 in the casing 7 so as to be fed by air contained in the plenum duct 8 to drive the electric generator.

In operation, the level of seawater in each chamber 1 oscillates with the motion of the generator structure and that of the seawaves and is shown in FIG. 1 at its mean lowest level, the mean upper level being shown by the broken line x—x. The oscillating seawater therefore acts in the manner of a piston member in the chamber 1, causing an indraught of air through the inlet duct 13 into the chamber 1 as the level of seawater falls, and discharge of air through the outlet valve 12 into the common plenum duct 8, as the level rises, where the air is collectively conducted to the turbine 17. The pressurized air in the plenum duct 8 acts on the surface of the seawater at the lower end 9 depressing the level of seawater and thereby provides a restoring force from the seawater in the lower end 9 which pressurizes the air in the plenum duct 8 to smooth out and reduce pressure fluctuations in the air therein.

It will be appreciated that there is a greater volume of air available to operate the turbine 17 conciniuously than the possibly more intermittent use of the turbine in the device described in British Patent Specification No. 1014196. Although the generator structure of FIGS. 1 and 1a has been described in relation to the use of a single turbine 17, several turbines 17 may be installed and fed from a single plenum duct 8.

Figure 2:
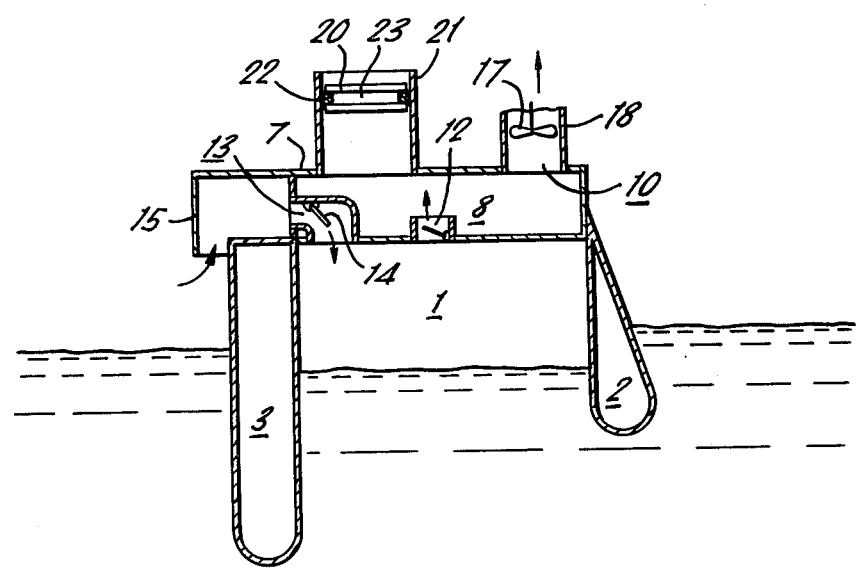
FIG. 2 shows a generator structure similar to that of FIG. 1.

As an alternative to a generator structure having the air in the plenum duct 8 pressurized by seawater at the lower end 9 of the plenum duct 8, an alternative arrangement may be used, for example, as shown in FIG. 2 to which reference is now made.

The generator structure shown in section in FIG. 2 is similar to that shown in FIGS. 1 and 1a except that the plenum duct 8 now only extends above the roof and not behind the aft buoyancy tank 3. The air in the plenum duct 8 is pressurized by a close-fitting weighted cap 20 slidably disposed in a relatively large diameter duct 21 extending upwardly from the casing 7, an 'O' ring seal 22 in an annular groove 23 extending around the cap 20 preventing the egress of air from the plenum duct 8. In operation, the cap 20 provides a constant pressurizing force on the air in the plenum duct 8, so that the turbine 17 can be operated at a substantially constant head by the pressurised air in the plenum duct 8. If desired the pressure exerted by the cap 20 may be supplemented by resilient means (not shown).

Figure 3A:
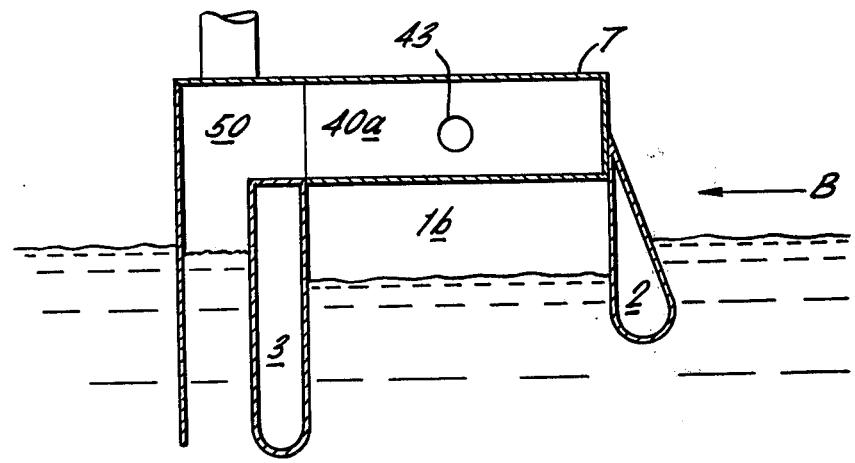
FIG. 3a shows a diagrammatic sectional representation about the line III—III in FIG. 3.
Figure 3:
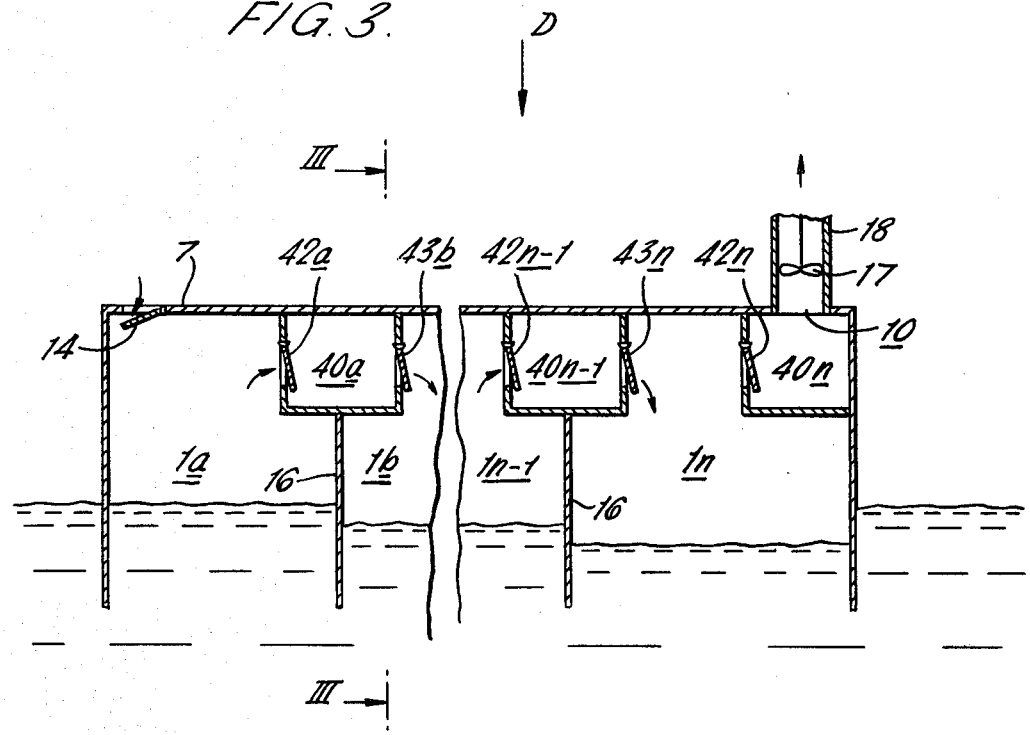
FIG. 3 shows in sectional elevation a diagrammatic representation of a generator structure having a series arrangement of chambers perpendicular to the incoming waves.

As an alternative to the parallel arrangements shown in FIGS. 1, 1a and 2, the chambers 1 may be arranged in a linear series relationship as shown in FIG. 3 to which reference is now made.

Figure 4:
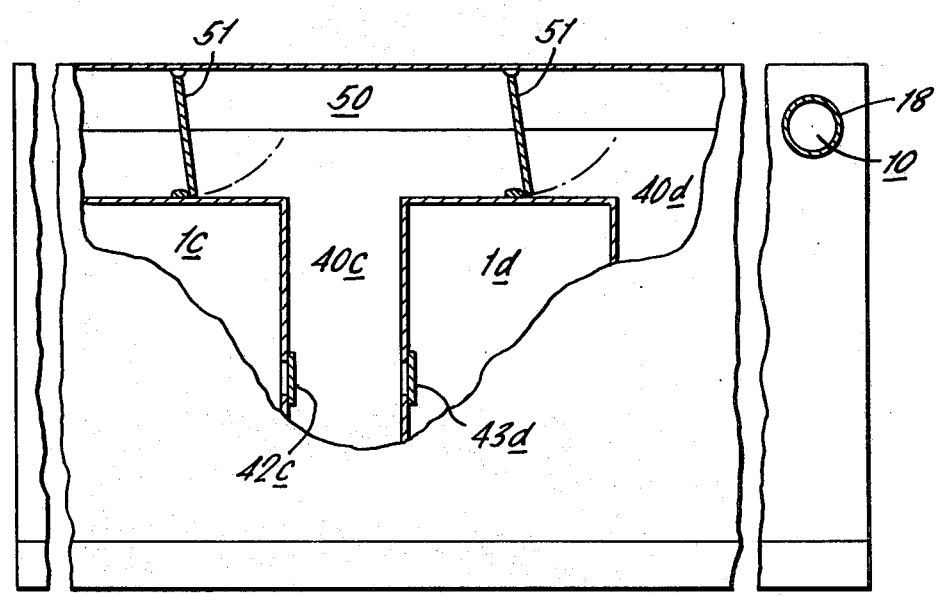
FIG. 4 shows a part-sectional view in the direction of arrow 'D' in FIG. 3.

In FIG. 3, a floating generator structure having a plurality of chambers $1-1n$ is shown, chamber $1a$ at one end of the structure having non-return inlet valve 14 for the indraught of air from the atmosphere, and chamber $1n$ at the other end having an upwardly extending duct 18 within which an air turbine 17 is disposed so as to drive an electric generator (not shown). The chambers $1a-1n$ are separated from each other by side walls 16 and plenum chambers $40a-40n$ which have non-return inlet valves $42a-42n$ and non-return outlet valves $43b-43n$ to allow air to flow therethrough the structure in series relationship from chamber $1a$ through to chamber $1n$. Each plenum chamber $40a-40n$ connects rearwardly with a plenum duct 50 which itself extends rearwardly to dip below the sea level so as to maintain a pressure on the air therein and also extends along the length of the structure to connect with the turbine duct 18 as shown in FIGS. 3a and 4 to which reference may be made. Shut-off valves 51 are disposed along the plenum duct 50 at a median position with respect to each chamber $1b-1n$. In other respects the structure shown in FIG. 3 is similar to that shown in FIG. 1 in that it is provided with fore and aft buoyancy tanks 2 and 3.

In operation, with shut-off valves 51 closed and the incoming waves in the direction of arrow "B" in FIG. 3a, the level of seawater in the chambers $1a-1n$ oscillates with the motion of the generator structure and that of the seawaves, and is shown in FIG. 3 at its mean level in each chamber $1a-1n$. As the seawater level falls, there is an indraught of air into chamber $1a$ through inlet valve 14. As the seawater level rises, air is discharged under pressure from chamber $1a$ through inlet valve $42a$ into the plenum chamber $40a$ and that portion of plenum duct 50 between closed shut-off valves 51 to which said plenum chamber $40a$ is connected. When the seawater level falls again, causing a fresh indraught of air into chamber $1a$, the pressurized air in plenum duct $40a$ flows into chamber $1b$ through outlet valve $43b$, its pressurized state depressing the mean seawater level in chamber $1b$ below that in chamber $1a$. The sequence of the collectively conducted flow of air from one chamber to another via a plenum duct $40a-40n$ continues along the series connected chambers $1a-1n$ with increase in air pressure along the series, until at chamber $1n$ the pressurized air is discharged into plenum chamber $40n$ and then into plenum duct 50 and through the turbine 17 at a higher air pressure than can be achieved by chambers connected in parallel.

The series arrangement shown in FIG. 3 is of particular benefit when the incoming wave power falls to a level which would require the air turbine 17 used in the parallel arrangement shown in FIGS. 1 and 1a to work outside its efficient working range. The series arrangement may be converted to a parallel arrangement similar to that described in relation to FIGS. 1 and 1a by opening valves 51 and closing valves $43b-43n$ using a switching means (not shown). With such a series/parallel arrangement, the parallel arrangement of chambers $1a-1n$ may be used at high incoming wavepower levels but switched by the switching means to a series arrangement of chambers $1a-1n$ at low incoming wavepower levels. Combinations of part-series and part-parallel flow arrangements through the structure may also be arranged by suitable selection of those valves 51 and $43b$ to $43n$ to be opened or closed by the switching means.

Although the invention has been described in relation to the use of a single air turbine, several turbines may be used depending on the quantity and pressure of the air discharged by the structure. Alternative working gases may be used, for example, where the gas is to be contained in a closed circuit system, exhaust gas from the turbine being conducted to the inlet ducts to the chambers.

Alternative shapes for the buoyancy tanks 2 and 3 may be used to suit particular applications.

The structures shown in FIGS. 1 to 4 may be made, for example, from metal or of a reinforced concrete construction, e.g. ferro-concrete or glass fibre reinforced concrete.

The forward buoyancy tank 2 shown in FIGS. 1, 2, 3a and 4, has been designed so that its forward face, upon which the incoming waves are incident, slopes downwardly and outwardly away from the freeboard of the floating generator structure in a direction towards the incoming waves, since it has been found that such an inclination of the forward face reduces the heave forces acting on the structure.

It will be appreciated that devices incorporating the invention will usually be located with mooring means (not shown).

Although the invention has been described as deriving electrical energy from wave power, the air turbine 17 may be arranged to operate a mechanical device, for example a pump to derive hydraulic or pneumatic power from wave power, or may be replaced by some other alternative mechanical means such as a reciprocating air engine for deriving power from the pressurized working gas.

Alternatively the device may be adapted to operate as a breakwater, by dispensing with the turbine 17 and turbine duct 18 of FIGS. 1 to 4 and selecting the dimensions of the orifice 10 so as to maximize the energy lost by the gas in flowing therethrough, thereby dissipating some of the energy of the sea waves. For example, in a breakwater having parallel connected chambers 1, a ratio of area of orifice/sum of cross-sectional areas of the chambers of between 1/100 to 1/200 is desirable.

We claim:

1. A device for extracting energy from waves on a liquid upon which the device is adapted to float, said device comprising:
   (a) a plurality of chambers, each chamber having,
      (i) a port means for flow of the liquid therethrough into into and out of the chamber so as to cause a column of liquid to oscillate in the chamber from the action of the waves;
      (ii) an inlet port means for entry of a working gas into the chamber; and
      (iii) an outlet port means for the discharge from the chamber of working gas pressurized by the oscillations of said column of liquid;
   (b) a duct for collecting the pressurized working gas discharged from said plurality of chambers and having a variable volume;
   (c) means for varying the volume of said duct in response to changes in pressure of the working gas in said duct so as to smooth out pressure fluctuations of the pressurized working gas in the duct; and
   (d) a single mechanical means to which the collected pressurized working gas from at least some of the chambers is conducted by the duct to extract energy from the pressurized working gas and thereby from the waves.

2. A device as claimed in claim 1, wherein the smoothing means includes an extension of the duct adapted to extend below the freeboard of the device, said extension having an opening below said freeboard for the flow of liquid therethrough and into the extension so that, in operation, liquid located in said extension resists the pressure of the pressurised working gas therein and applies a smoothing pressure thereto.

3. A device as claimed in claim 1, wherein the smoothing means comprises,
   (a) a branch duct upstanding from the duct means,
   (b) a weight means slidably engaged in said branch duct, and
   (c) gas sealing means disposed between the weight means and the branch duct, the weight means being arranged to be supported by the pressure of the pressurised working gas in the duct means and branch duct, thereby to apply a smoothing pressure to said pressurised working gas.

4. A device for extracting energy from waves on a liquid upon which the device is adapted to float, said device comprising
   (a) a plurality of chambers, each chamber having,
      (i) a port means for flow of the liquid therethrough into and out of the chamber so as to cause a column of liquid to oscillate in the chamber from the action of the waves;
      (ii) an inlet port means for entry of a working gas into the chamber; and
      (iii) an outlet port means for the discharge from the chamber of working gas pessurized by the oscillations of said column of liquid;
   (b) duct means for collecting the pressurized working gas discharged from said plurality of chambers;
   (c) means for applying a smoothing pressure on the pressurized working gas in the duct means;
   (d) mechanical means to which the collected pressurized working gas is conducted by the duct means to extract energy from the pressurized working gas and thereby from the waves; and
   (e) a forward face of the device arranged to be incident to incoming waves, the forward face sloping downwardly and outwardly away from the freeboard of the device in a direction towards said incoming waves to reduce heave forces on the device.

5. A device for extracting energy from waves on a liquid upon which the device is adapted to float, said device comprising
   (a) a plurality of chambers arranged so that a forward buoyancy tank defines one wall of each chamber, an aft bouyancy tank defines another wall of each chamber, and the forward and aft bouyancy tanks both have rounded lower edges, each chamber having,
      (i) a port means for flow of the liquid therethrough into and cut out of the chamber so as to cause a column of liquid to oscillate in the chamber from the action of the waves;
      (ii) an inlet port means for entry of a working gas into the chamber; and
      (iii) an outlet port means for the discharge from the chamber of working gas pressurized by the oscillations of said column of liquid;
   (b) duct means for collecting the pressurized working gas discharged from said plurality of chambers;
   (c) means for applying a smoothing pressure on the pressurized working gas in the duct means; and
   (d) mechanical means to which the collected pressurized working gas is conducted by the duct means to extract energy from the pressurized working gas and thereby from the waves.

6. A device as claimed in claim 1, wherein the mechanical means comprises an air turbine.

7. A device as claimed in claim 1, wherein the mechanical means comprises an orifice means selected so that the loss of energy of the pressurized working gas in flowing through the orifice means dissipates some of the energy of the waves, whereby the device may be operated as a breakwater.

8. A device as claimed in claim 1, wherein the device is fabricated of ferro-concrete or glass fibre reinforced concrete.

9. A device for extracting energy from waves on a liquid upon which the device is adapted to float, comprising
   (a) a plurality of chambers, each chamber having,
      (i) port means for flow of the liquid therethrough into and out of the chamber so as to cause a column of liquid to oscillate in the chamber from the action of the waves;
      (ii) inlet port means for the flow of a working gas into the chamber, and
      (iii) outlet port means for the discharge from the chamber of working gas pressurised by the oscillations of said column of liquid, the chambers being connected in series relationship so that pressurised working gas discharged through the outlet port means of one chamber enters an adjacent chamber along the series through the inlet port means thereof, and the inlet port means of the first chamber providing an inlet for the working gas into the series of chambers, and
   (b) mechanical means for extracting energy from the pressurised working gas and to which the pressurised working gas is discharged through the outlet port means of the last chamber in the series.

10. A device as claimed in claim 9 and having a forward face which is arranged to be incident to incoming waves, wherein the forward face slopes downwardly and outwardly away from the freeboard of the device in a direction towards said incoming waves to reduce heave forces on the device.

11. A device as claimed in claim 9, wherein a forward buoyancy tank defines one wall of each chamber, an aft buoyancy tank defines another wall of each chamber, and the forward and aft buoyancy tanks both have rounded lower edges.

12. A device as claimed in claim 9, wherein the mechanical means comprises an air turbine.

13. A device as claimed in claim 9, wherein the mechanical means comprises an orifice means selected so that the loss of energy of the pressurised working gas in flowing through the orifice means dissipates some of the energy of the waves, whereby the device may be operated as a breakwater.

14. A device as claimed in claim 9, wherein the device is fabricated of ferro-concrete or glass fibre reinforced concrete.

15. A device for extracting energy from waves on a liquid upon which the device is adapted to float and comprising, (a) a forward buoyancy tank generally of triangular form in a vertical plane normal to the front of the device so that the front of the tank upon which incoming waves will be incident slopes downwardly and away from the freeboard of the device in the direction of said incoming waves;

(b) an aft buoyancy tank generally of rectangular form in said vertical plane, both the forward and aft buoyancy tanks having rounded lower edges;

(c) a plurality of side walls extending between the forward and aft buoyancy tanks to define therebetween a plurality of chambers open at the bottom thereof for the entry of the liquid thereinto and which liquid is arranged to be oscillated by the motion of the waves;

(d) a roof extending across the chambers;

(e) a casing spaced from and extending across the roof and the aft buoyancy tank to define therebetween a common plenum duct, the casing extending below the freeboard of the device and open below said freeboard to the liquid which is arranged to close said plenum duct;

(f) an inlet means for conducting air from outside the device into each chamber, said inlet means having a hood to protect the outer end thereof from spray;

(g) an outlet means in the roof for discharging into the plenum duct air pressurised by said oscillations of the liquid in each chamber;

(h) a branch duct extending upwardly from the plenum duct, and (i) an air turbine disposed in the branch duct for extracting energy from the pressurised air in the plenum duct, and thereby from the waves.

* * * * *